Dec. 6, 1932.  J. H. FOX  1,890,322
APPARATUS FOR MAKING PLATE GLASS
Filed Sept. 20, 1929  7 Sheets-Sheet 1
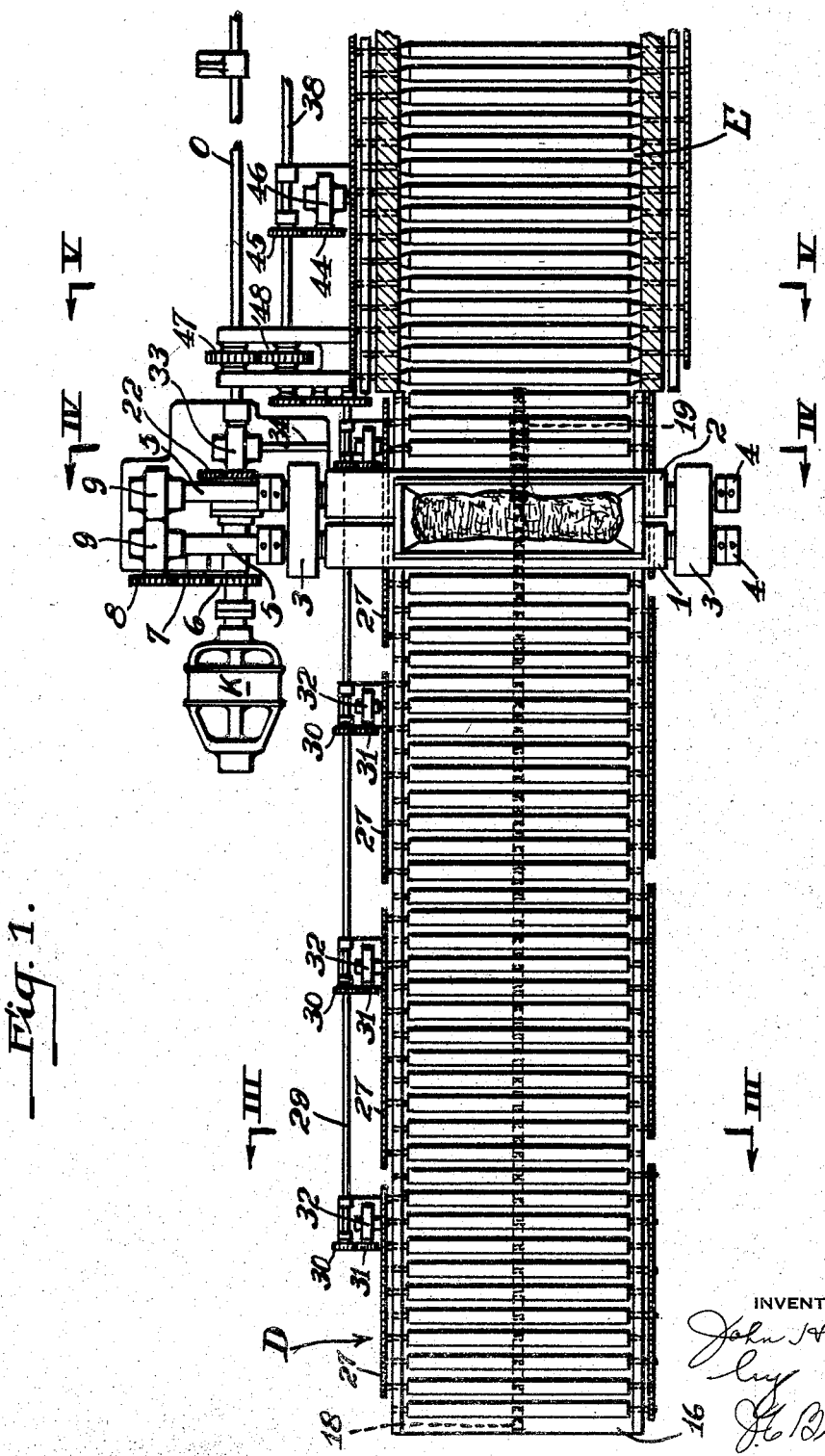

Dec. 6, 1932.    J. H. FOX    1,890,322
APPARATUS FOR MAKING PLATE GLASS
Filed Sept. 20, 1929    7 Sheets-Sheet 2
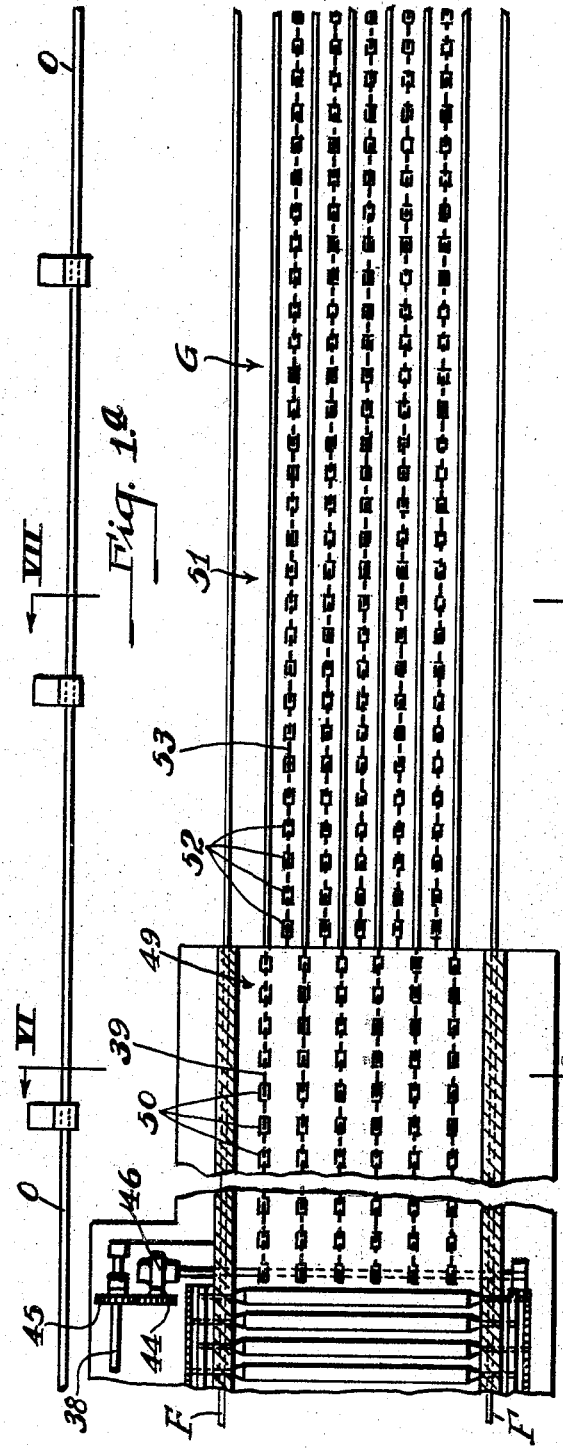
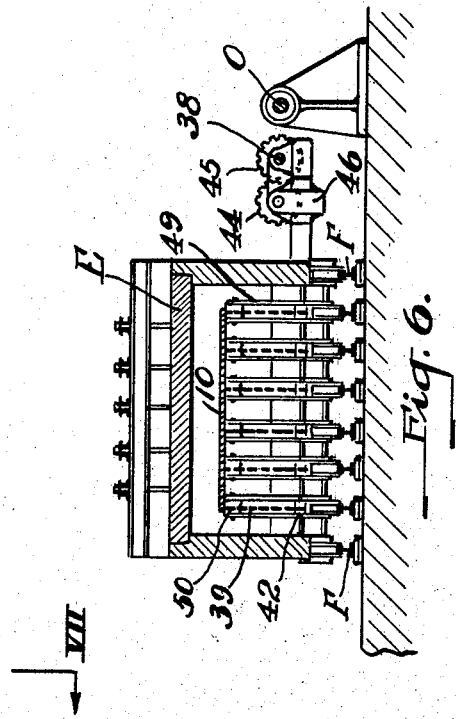
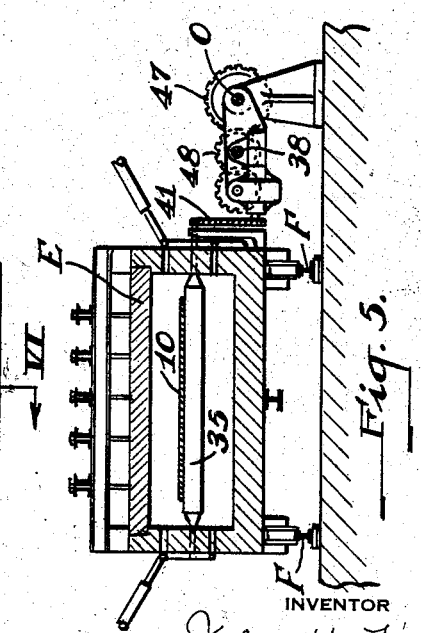
INVENTOR
John H. Fox
James L. Bradley

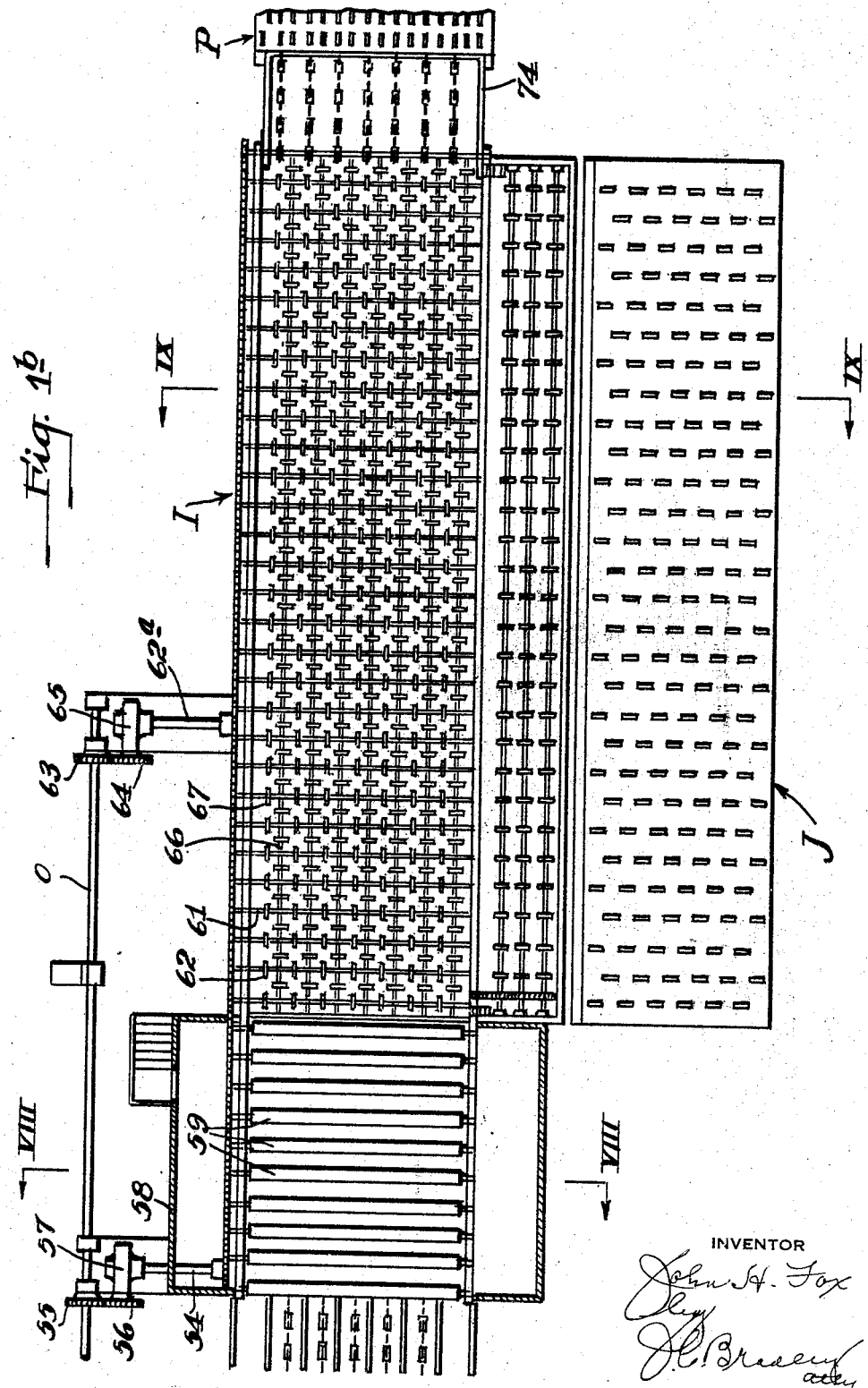

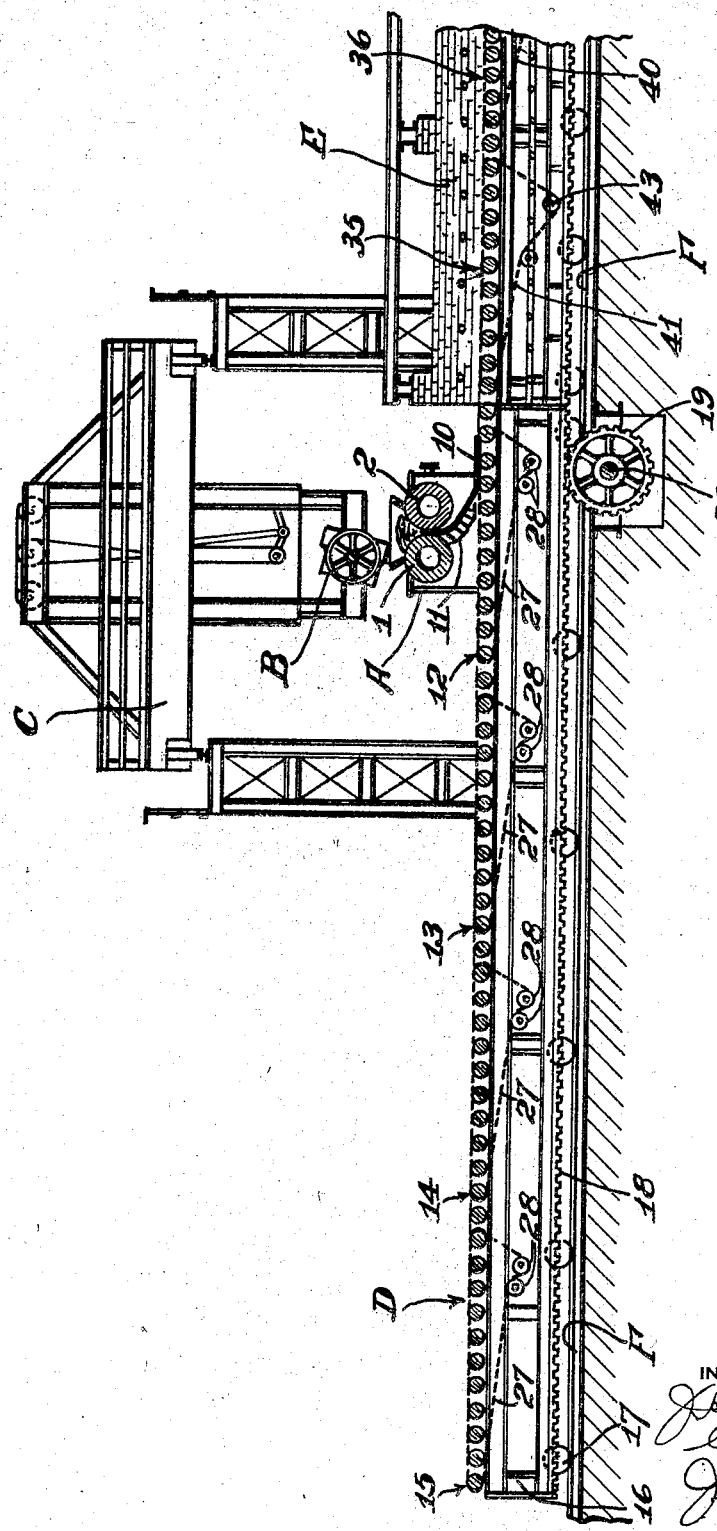

Dec. 6, 1932.  J. H. FOX  1,890,322
APPARATUS FOR MAKING PLATE GLASS
Filed Sept. 20, 1929   7 Sheets-Sheet 5
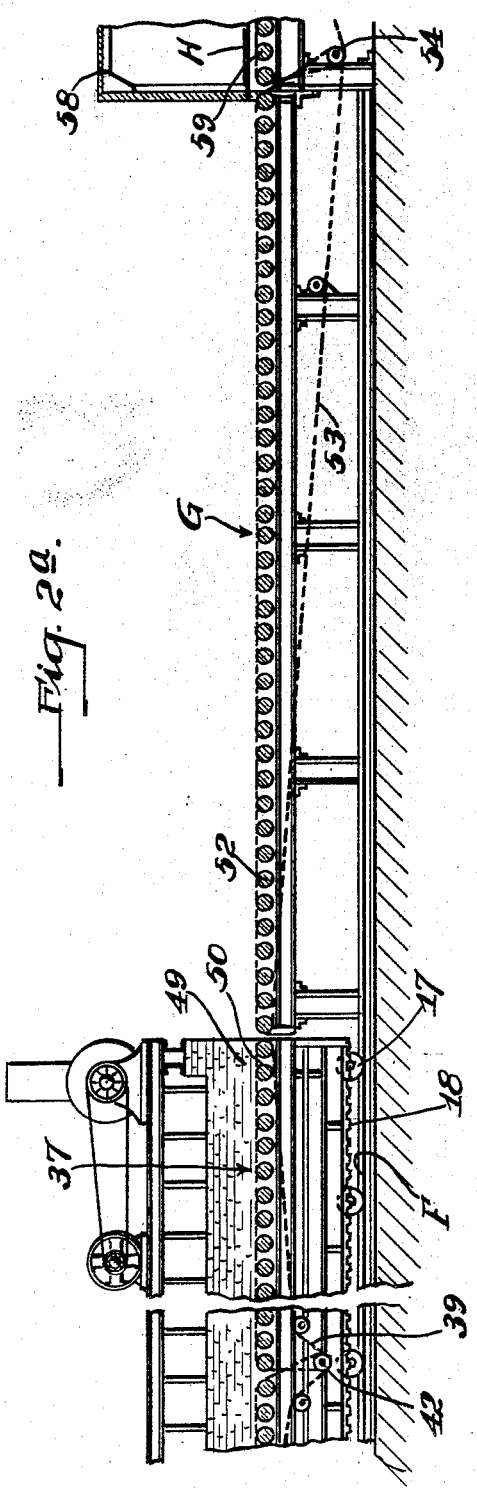
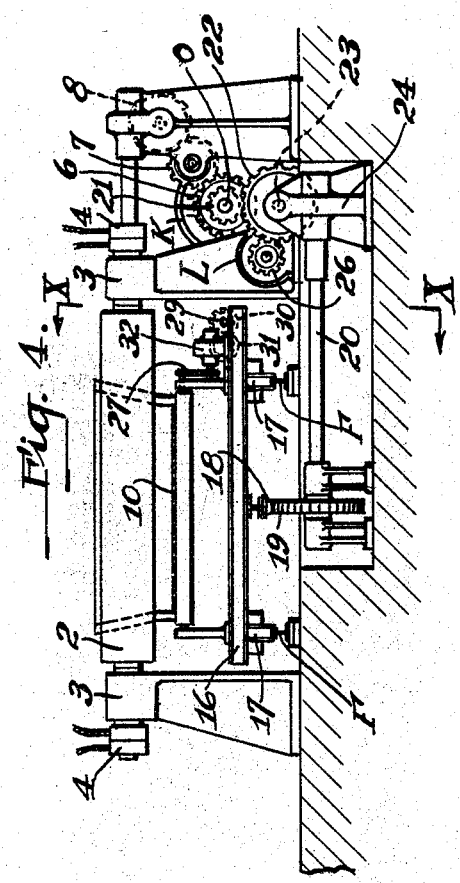

Dec. 6, 1932.  J. H. FOX  1,890,322
APPARATUS FOR MAKING PLATE GLASS
Filed Sept. 20, 1929   7 Sheets-Sheet 6
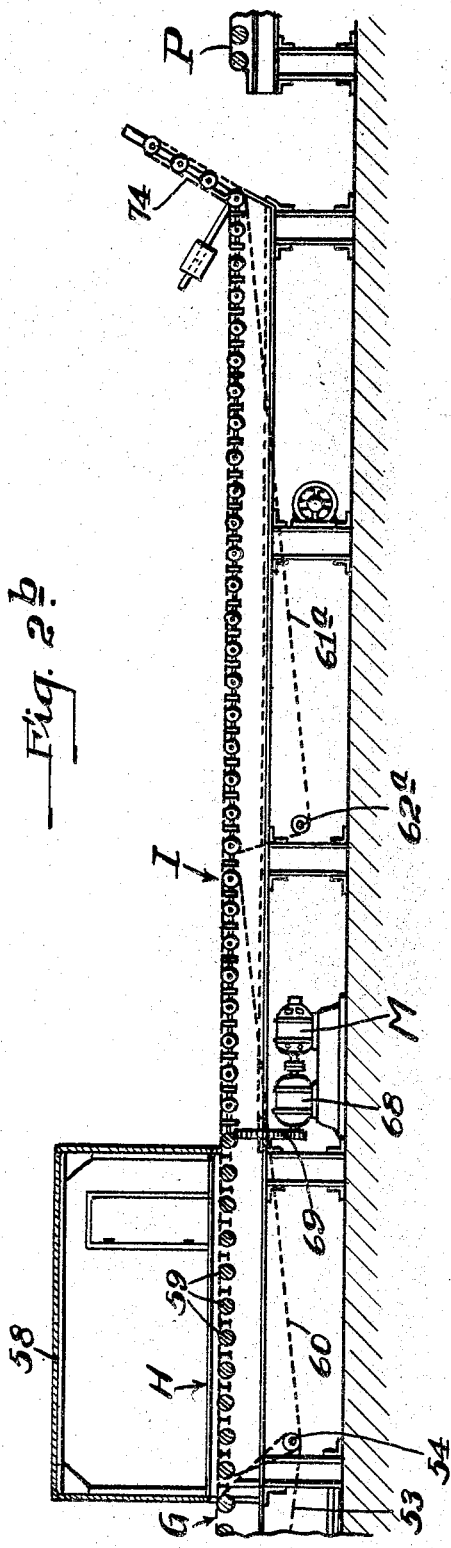
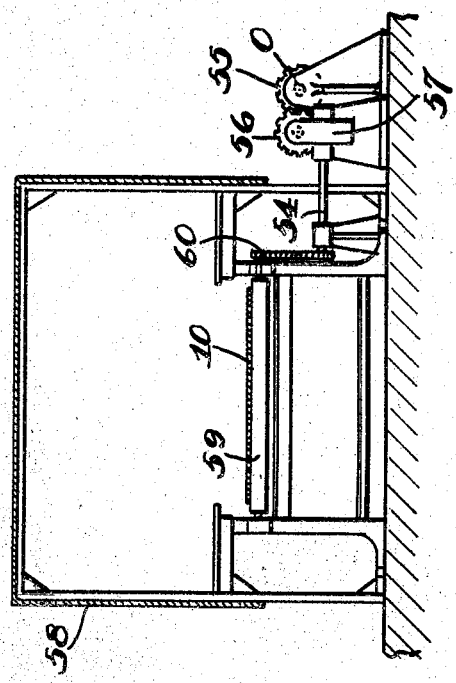
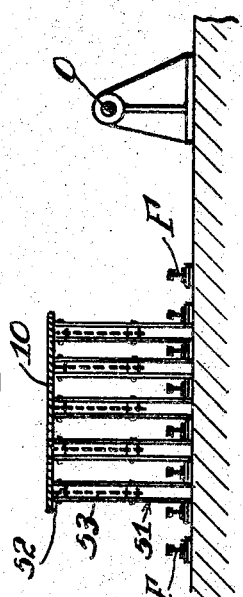
INVENTOR
John H. Fox

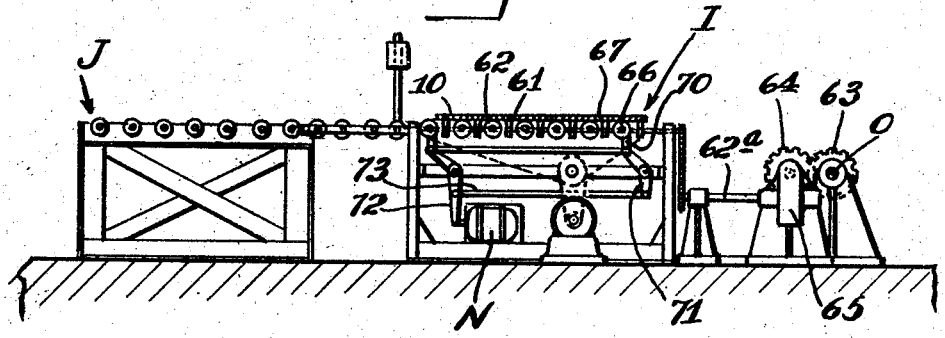
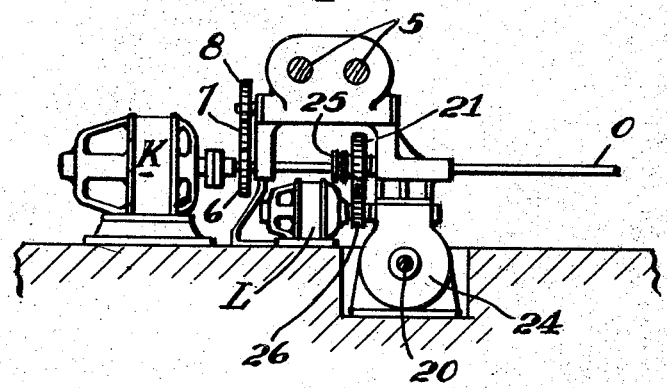
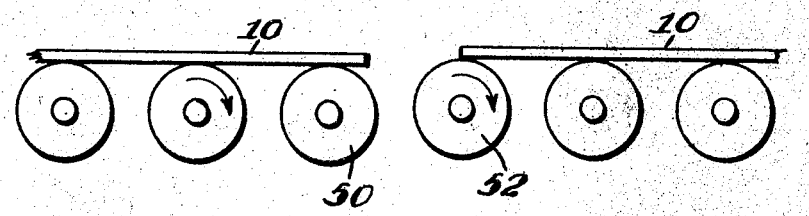

Patented Dec. 6, 1932

1,890,322

UNITED STATES PATENT OFFICE

JOHN H. FOX, OF PITTSBURGH, PENNSYLVANIA, ASSIGNOR TO PITTSBURGH PLATE GLASS COMPANY, A CORPORATION OF PENNSYLVANIA

APPARATUS FOR MAKING PLATE GLASS

Application filed September 20, 1929. Serial No. 394,033.

The invention relates to apparatus for making plate glass. It has for its object the provision of improved apparatus permitting the intermittent formation, by a rolling operation, of sheets of glass at relatively high speed and the annealing of such sheets at relatively low speed. The rolling at high speed improves the quality of the glass and makes it possible to produce thinner glass than would otherwise be practicable by a rolling operation, while the low annealing speed permits the length of the leer to be kept within reasonable limits.

The desired result is accomplished by mounting the entire leer (as well as the runway onto which the glass is rolled or cast) for bodily movement endwise of the leer, such leer and runway being of the roller type and having the rolls driven constantly at a relatively low speed. The sheet forming or rolling apparatus is located in fixed position above the runway, and during the casting or rolling operation, the leer and runway are moved forward at a speed sufficient to compensate for the excess of speed of sheet formation over the peripheral annealing speed at which the runway and leer rolls are driven. For example, if the glass sheet is rolled out between the forming rolls at the rate of forty feet per minute and the runway and leer rolls have a peripheral speed of ten feet per minute, the bodily forward movement of the runway and leer, to compensate for this difference in speed, would have to be at the rate of thirty feet per minute. The runway and leer would therefore move forward at this speed until the sheet is formed and deposited on the runway rolls, after which the forward movement of the runway and leer is stopped and such parts are moved back quickly to starting position preliminary to another sheet forming operation. This procedure requires special means for taking care of the sheets as they emerge from the leer, the details of which are fully explained hereinafter. One embodiment of the invention is illustrated in the accompanying drawings, wherein:

Figures 1, 1ª, and 1ᵇ are plan views partially in section. Figs. 2, 2ª, and 2ᵇ are longitudinal sections through the apparatus. Figs. 3, 4, 5, 6, 7, 8 and 9 are transverse sections through the structure on the lines III—III, IV—IV, V—V, VI—VI, VII—VII, VIII—VIII and IX—IX of Figs. 1 and 1ª. Fig. 10 is a section on the line X—X of Fig. 4. And Fig. 11 is a diagrammatic side elevation showing the relation of the rolls at the end of the leer with respect to the rolls on the receiving table.

Referring to the drawings, A is the sheet forming or casting apparatus between which a body of glass is poured from the pot B; C is a crane for bringing the pot to pouring position over the forming rolls; D is a roller runway onto which the glass sheet formed between the forming rolls is directed during the casting or forming operation; E is the annealing leer in alignment with the runway; F is the track on which the leer and runway are mounted for forward movement during the casting operation, as later described; G is a receiving table to which a sheet of glass is delivered from the leer on each forward movement thereof; H is an inspection table over which the glass passes from the receiving table; I is a transfer table for receiving the glass from the inspection table, such transfer table being provided with means for moving the glass laterally; J is a cutting table along the side of the transfer table for receiving the glass from such table preliminary to cutting; K is the main driving motor from which the forming rolls and the leer and table rolls are all operated and which also serves to drive the means which moves the leer and runway forward; L (Figs. 4 and 10) is a reversing motor which serves to move the leer and runway from their forward position to their rear position; M (Fig. 2ᵇ) is the motor which operates the cross take-off rolls of the transfer table I; and N (Fig. 9) is a power cylinder which operates to raise and lower the cross rolls of the transfer table I.

The rolling apparatus A comprises a pair of hollow rolls 1, 2 mounted upon standards 3, 3 and provided with swivels 4, 4 at their ends and suitable pipe connections for circulating cooling fluid through the rolls. The ends of the rolls are provided with a pair of tumbler shafts 5, 5 driven from the motor K through the intermediary of the three gears 6, 7 and 8 and worm reduction gearing in the casings 9, 9. The glass sheet 10 formed from the mass of glass deposited between the rolls passes down over the apron 11 onto the first of the four sets of rolls 12, 13, 14 and 15 constituting the runway, the runway and leer being shown in Figs. 1 and 2 at their left hand extreme of movement, which is the position occupied when the formation of the sheet is first started.

The runway and leer are mounted upon a suitable supporting framework 16 of commercial sections provided with the wheels 17 running on the track F heretofore referred to. This framework is provided from end to end with a rack 18, such rack serving as one of the parts by means of which the bodily endwise movement of the runway and leer is secured. This rack is engaged by a spur gear 19 mounted on a transverse shaft 20 and such shaft is driven from the motor K through the intermediary of suitable reduction gearing, including the gear 21, mounted on the main leer drive shaft O which extends from the motor K to the transfer table I, as indicated in Fig. 1. The gear 21 engages a spur gear 22, keyed to a worm shaft 23 (Fig. 4), and this worm operates a worm wheel in the casing 24 (Figs. 4 and 10), such worm wheel being keyed to the shaft 20, which carries the gear 19. A magnetic clutch 25 (Fig. 10) serves to secure the gear 21 to the shaft O. When it is desired to reverse the movement of the runway and leer, the magnetic clutch 25 is released and current is supplied to the reversing motor L (Figs. 4 and 10), the drive shaft of this motor being provided with a gear 26 which meshes with the gear 22.

The sets of rolls 12, 13, 14 and 15 constituting the runway are driven from the chains 27, 27, 27, 27 passing around sprockets on the ends of the rolls and around drive sprockets 28, 28, 28, 28 mounted on transverse shafts. These transverse shafts are driven from the countershaft 29 (Fig. 1) through the gears 30, 31 and suitable reduction gearing in the casings 32. The drive shaft 29 is itself driven from the main drive shaft O through reduction gearing in the casing 33, the transverse shaft 34 and a gear connection (not shown) between such shaft and the shaft 29.

The leer E is shown as including only three sets of rolls 35, 36 and 37, but it will be understood that the leer as actually constructed involves a large number of sections aggregating in the neighborhood of 600 feet in length. The short section shown, however, will be sufficient to clearly illustrate the construction and method of operation. The sets of rolls in the leer section are all driven from the countershaft 38 mounted to move endwise with the leer, the drive intermediate the countershaft and the sets of rolls being the same as that just described in connection with the runway. The sets of rolls are driven from the chains 40 and 41 passing around sprockets on the ends of the rolls, the sprocket chains being driven by sprockets on the transverse drive shafts 42 and 43. Such shafts are in turn driven from the shaft 38 through the gears 44, 45 and reduction gearing in the casings 46. The countershaft 38 is driven from the main drive shaft O through the spur gears 47, 48, the shaft O having a sliding splined connection with the gear 47, since the shaft O is fixed against endwise movement and the gears 47 and 48 move endwise with the runway and leer.

At the outlet end of the leer is a section somewhat greater in length than the length of the glass sheets which are to be handled in the leer made up of the six spaced sections 49, 49, 49, etc. Each of these sections is made up of a suitable frame provided with the series of short rollers 50. Each of these rollers is in two parts with a sprocket therebetween, these sprockets and the rolls being driven by the series of chains 39 which pass around sprockets on the shaft 42, the shaft 42 being driven from the countershaft 38, as heretofore described. In alignment with the end of the leer is a receiving table made up of the plurality of spaced sections 51, 51, etc. adapted to interfit with the sections 49, 49, etc. so that when the leer moves to the right, the two sets of sections will telescope, the purpose being to transfer the sheet on the sections 49, 49, etc. to the receiving table I made up of the sections 51, 51, etc. The construction of the sections 51, 51, etc. and the method of driving the two part rollers 52 which constitute the roller bed thereof is the same as described in connection with the sections 49, 49, etc. That is, the sprockets are provided between the parts of the rolls around which pass sprocket chains 53, which sprocket chains pass around drive chains on the shaft 54. This shaft 54 is driven from the main drive shaft O through the gears 55, 56 and the reduction gearing in the casing 57. As indicated in Fig. 11, the tops of the rolls 52 which make up the bed of the receiving table I are slightly above the tops of the rollers 50 constituting the bed at the outlet end of the leer so that when the leer moves to the right, the sheet carried by the outlet end on the rolls 50 rides up over the rolls 52, thus transferring the sheet from the rolls 50 to the rolls 52 by the time the leer arrives at its extreme right hand position, at which time the entire sheet has been moved over the top of the receiving table. There is thus no tendency to move the sheet backward when the leer moves back again to the left, the glass sheet being left supported on the rollers 52 which are preferably rotated at a peripheral speed several times that of the leer rollers in order to get the sheet out of the way before the delivery of the next sheet from the leer.

The glass sheet passes from the receiving table I onto the inspection table H which is surrounded by a shed 58 and provided with suitable lighting devices to facilitate the observation of the glass from above by the inspectors. The sheet passes over the rolls 59 which are spaced relatively far apart to facilitate examination and these rolls are driven from a chain 60 which passes around a sprocket on the drive shaft 54 and around sprockets on the ends of the shafts.

From the inspection table the last sheet passes onto the transfer table I. This table has a bed consisting of a plurality of transverse shafts 61 each provided with a set of rollers 62, such shafts having sprockets at their ends driven from the chains 60 and 61ª. The drive of the chain 60 has heretofore been described and the drive of the chain 61ª is similar, such chain being driven from a sprocket on a cross shaft 62ª driven from the main drive shaft O through the gears 63, 64 and reduction gearing in the casing 65. This table is also provided with means for moving the glass sheet laterally off of the table onto the cutting table J, such means comprising a plurality of longitudinally extending shafts 66, each provided with a set of rollers 67, these rollers being driven from the motor M (Fig. 2ᵇ) which operates through the reducing gearing in the casing 68 to drive a chain 69 which passes around sprockets on the ends of the shafts 66. In order to transfer the sheet from the rollers 62 to the rollers 67, it is necessary to have one of these sets of rollers movable vertically and this is accomplished by mounting the shafts 66 of the rollers 67 for vertical movement upon the links 70 (Fig. 9) operated by the bell crank levers 71. These levers are swung from the lifting cylinder N by means of the levers 72 and connecting rods 73. The glass sheet may also be transferred from the table I to another cutting table P in alignment with such table I, a drop apron 74 being provided to bridge the space between the two tables.

In operation, the starting position of the runway and leer is slightly to the left of that shown in Figs. 1 and 2, at which time the apron 11 leading from the forming rolls 1 and 2 lies above the extreme right hand end of the first section of the runway. Upon pouring a pot of glass into the space between the rolls, the magnetic clutch 25 is thrown to connect the drive from the motor K to the means for moving the leer and runway to the right so that by the time the glass reaches the rollers 12, the runway is moving to the right at the proper speed. The speed of movement of the leer and runway plus the peripheral speed of the leer and runway rolls is substantially equal to the peripheral speed of the forming rolls 1 and 2, so that the glass sheet is deposited smoothly upon the runway as it moves to the right, this movement being continued until the glass is exhausted and the entire sheet lies upon the runway. The rotation of the rolls of the runway and of the leer now feed the glass into the leer and therethrough. As soon as the forward bodily movement of the leer runway is completed, these parts are moved back to starting position, the clutch 25 being at this time released and current supplied to the motor L (Fig. 10) to secure the reverse rotation of the gear 19 so that the runway and leer are moved to the right. This movement is stopped as soon as the parts arrive at their starting position, such parts occupying this position until the entire pot of glass is poured between the forming rolls 1 and 2. When the glass sheet arrives at the extreme outlet end of the leer, the forward movement of the leer transfers such sheet to the receiving table G, as heretofore described, the casting operations, the movement of the glass through the leer and the reciprocation of the leer being so timed that the sheet at the extreme end of the leer is always in proper position for the transfer when the leer moves forward. After the sheet is deposited upon the table G, it is fed rapidly from this table over the inspection table H and onto the transfer table I. As soon as the sheet is completely on this table, the shafts 66 carrying the rolls 67 are raised so that they lie above the rolls 62, and on operating the motor M, the shafts are rotated to carry the sheet onto the cutting table J, thus completing the cycle of operations.

What I claim is:

1. In apparatus for making a sheet of glass, a roller leer and a roller runway at the entrance end of the leer mounted for bodily movement in a longitudinal direction, means for driving the runway and leer rolls at the same constant speed, a pair of forming or sizing rolls mounted in fixed position above the runway, means for driving the forming rolls, means for moving the runway and leer forward during the formation of the sheet between the forming rolls and for returning the runway and leer to starting position, a roller receiving table at the outlet end of the leer arranged to receive a sheet of glass from the leer on the forward movement thereof and retain such sheet thereon as the leer moves rearward, and means for driving the rolls of the receiving table to move the sheet along the table.

2. In apparatus for making a sheet of glass, a roller leer and a roller runway at the entrance end of the leer mounted for bodily movement in a longitudinal direction, means for driving the runway and leer rolls at the same constant speed, a pair of forming or sizing rolls mounted in fixed position above the runway, means for driving the forming rolls, means for moving the runway and leer forward during the formation of the sheet between the forming rolls and for returning the runway and leer to starting position, a roller receiving table at the outlet end of the leer arranged to receive a sheet of glass from the leer on the forward movement thereof and retain such sheet thereon as the leer moves rearward, and means for driving the rolls of the receiving table to move the sheet along the table, the end of the leer and said receiving table having interfitting sections to permit such sections to move past each other, and the rolls on the receiving table having their tops slightly above those of the leer to facilitate the transfer of the sheet from the leer rolls to the rolls of the receiving table.

3. In apparatus for making a sheet of glass, a roller leer and a roller runway at the entrance end of the leer mounted for bodily movement in a longitudinal direction, means for driving the runway and leer rolls at the same constant speed, a pair of forming or sizing rolls mounted in fixed position above the runway, means for driving the forming rolls, means for moving the runway and leer forward during the formation of the sheet between the forming rolls and for returning the runway and leer to starting position, a roller receiving table at the outlet end of the leer arranged to receive a sheet of glass from the leer on the forward movement thereof and retain such sheet thereon as the leer moves rearward, and means for driving the rolls of the receiving table at a peripheral speed in excess of that of the leer rolls.

4. In apparatus for making a sheet of glass, a roller leer and a roller runway at the entrance end of the leer mounted for bodily movement in a longitudinal direction, means for driving the runway and leer rolls at the same constant speed, a pair of forming or sizing rolls mounted in fixed position above the runway, means for driving the forming rolls, means for moving the runway and leer forward during the formation of the sheet between the forming rolls and for returning the runway and leer to starting position, a roller receiving table at the outlet end of the leer arranged to receive a sheet of glass from the leer on the forward movement thereof and retain such sheet thereon as the leer moves rearward, a roller transfer table in alignment with the end of the receiving table, means carried by the transfer table for moving the glass sheets received thereof laterally off of the table, and means for driving the rolls of the receiving and transfer table to carry the sheets longitudinally of such tables.

5. In apparatus for making a sheet of glass, a roller leer and a roller runway at the entrance end of the leer mounted for bodily movement in a longitudinal direction, means for driving the runway and leer rolls at the same constant speed, a pair of forming or sizing rolls mounted in fixed position above the runway, means for driving the forming rolls, means for moving the runway and leer forward during the formation of the sheet between the forming rolls and for returning the runway and leer to starting position, a roller receiving table at the outlet end of the leer arranged to receive a sheet of glass from the leer on the forward movement thereof and retain such sheet thereon as the leer moves rearward, a roller transfer table in alignment with the end of the receiving table, means carried by the transfer table for moving the glass sheets received thereon laterally off of the table, a roller inspection table between the receiving and transfer tables, and means for driving the rolls of all of said tables to carry the glass sheets longitudinally of said tables.

In testimony whereof, I have hereunto subscribed my name this 17th day of Sept., 1929.

JOHN H. FOX.